US012687886B2

(12) United States Patent

Holverson et al.

(10) Patent No.: US 12,687,886 B2

(45) Date of Patent: Jul. 21, 2026

(54) ADJUSTABLE AR/VR HEADSET

(71) Applicant: Microsoft Technology Licensing, LLC, Redmond, WA (US)

(72) Inventors: Erik Alan Holverson, Redmond, WA (US); Nicolas A. Denhez, Redmond, WA (US); Gabriele D'Amone, San Mateo, CA (US); Young Duk Song, Redmond, WA (US); James Anthony Trzaskos, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 18/678,954

(22) Filed: May 30, 2024

(65) Prior Publication Data

US 2025/0370501 A1 Dec. 4, 2025

(51) Int. Cl.
| | |
|---|---|
| H04R 1/10 | (2026.01) |
| F16M 13/04 | (2006.01) |
| G06F 1/16 | (2006.01) |

(52) U.S. Cl.
CPC ............. G06F 1/163 (2013.01); F16M 13/04 (2013.01)

(58) Field of Classification Search
CPC ........ H04R 1/10; H04R 1/105; H04R 5/0335; H04R 2205/022
See application file for complete search history.

(56) References Cited

U.S. PATENT DOCUMENTS

| | | | | |
|---|---|---|---|---|
| 4,277,654 A | * | 7/1981 | Penning | H04R 5/0335 381/374 |
| 2008/0175406 A1 | * | 7/2008 | Smith | H04R 1/1066 381/87 |
| 2017/0264984 A1 | * | 9/2017 | Pelland | H04R 5/0335 |
| 2018/0219404 A1 | * | 8/2018 | Urbach | G06F 1/163 |
| 2021/0029435 A1 | * | 1/2021 | Siahaan | H04R 1/1075 |
| 2022/0400327 A1 | * | 12/2022 | Wang | H04R 1/105 |
| 2023/0421957 A1 | * | 12/2023 | Zhang | H04R 5/0335 |

* cited by examiner

*Primary Examiner* — Suhan Ni

(74) *Attorney, Agent, or Firm* — Schwegman Lundberg & Woessner, P.A.

(57) ABSTRACT

An AR/VR headset that is configured to be worn on a user's head. The headset includes a first sprocket, a second sprocket and a ball chain engaging the first and second sprockets. A rotating actuator engages the first sprocket such that the first sprocket rotates and the ball chain translates along the first and second sprockets when torque is applied to the rotating actuator. The ball chain applies torque to the second sprocket as the ball chain translates along the first and second sprockets. A transmission gear engages the second sprocket and rotates with the second sprocket. A first arm includes a first set of internal gear teeth, and a second arm includes a second set of internal gear teeth. The transmission gear engages the first and second sets of gear teeth such that rotation of the transmission gear moves the second arm relative to the first arm.

20 Claims, 18 Drawing Sheets

ADJUSTABLE AR/VR HEADSET

TECHNICAL FIELD

Embodiments described herein generally relate to an adjustable AR/VR headset.

BACKGROUND

The fit systems of existing AR/VR headsets utilize a central rack and pinion system. These types of rack and pinion systems undesirably require significant space within the headset enclosure.

DESCRIPTION OF EMBODIMENTS

Figure 1A:
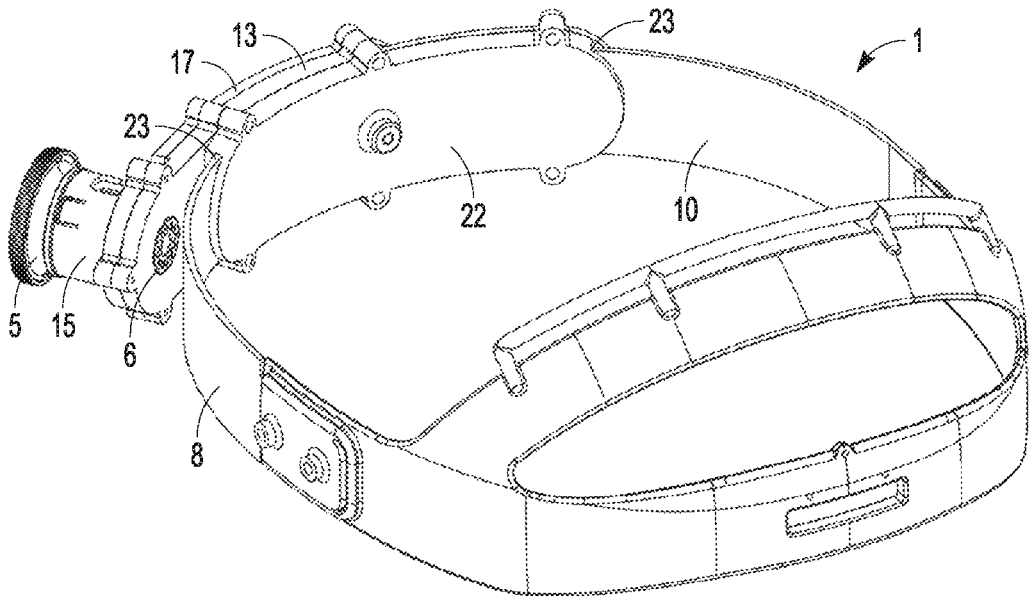
FIGS. 1A-1B show perspective views of an example headset.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodi- ments set forth in the claims encompass all available equiva- lents of those claims.

Orientation terminology, such as "horizontal," as used in this application is defined with respect to a plane parallel to the conventional plane or surface of a wafer or substrate, regardless of the orientation of the wafer or substrate. The term "vertical" refers to a direction perpendicular to the horizontal as defined above. Prepositions, such as "on," "side" (as in "sidewall"), "higher," "lower," "over," and "under" are defined with respect to the conventional plane or surface being on the top surface of the wafer or substrate, regardless of the orientation of the wafer or substrate.

One of the concerns with traditional AR/VR headset designs is that they utilize a central rack and pinion system. These known rack and pinion systems requires significant space within the headset enclosure. The configuration within the enclosure becomes overly complicated because the inter- nal layout is required to arrange a central dial that protrudes through the PCB causing many design challenges.

Existing adjustment assemblies for traditional headsets also typically utilize a nylon cable that comes with signifi- cant disadvantages. When nylon cables are used, the adjust- ment range is limited by the size of the spool for storing the nylon that is available. The larger the spool the more adjustment range is possible. However, making the spool larger results in an unwanted increase in the size of the adjustment mechanism as well as an increased possibility of tangling the nylon cable during operation of the adjustment mechanism.

It should be noted that any cable in tension wants to be straight such that when existing adjustment mechanisms which utilize nylon cables are operated, the cable that is utilized will become straight when pulled in tension. This is problematic in a curved fit system because the configuration of the adjustment mechanism needs to undesirably (i) occupy a large volume to accommodate the cables in ten- sion; (ii) have increased housing strength to resist the forces that are caused by the cables in tension; and/or (iii) be able to accept large increases in adjustment force due to the excessive friction of the cable as it moves over a curved surface.

The AR/VR headsets described herein use a ball chain to adjust the arms of the headset. The ball chain provides significant operational benefits as the ball chain allows adjustment along a non-linear path with reduced friction and improved smoothness as compared to a cable driven design. The ball chain is also not limited by length as compared to nylon cable systems. In addition, the uses of a ball chain are able to accommodate an infinite adjustment range.

It should be noted that the spacing between balls on the ball chain stays consistent during operation. In addition, dividing the contact area up into discreet elements helps to reduce friction of the adjustment mechanism because the individual contact points for each ball link become a bearing surface as opposed to a nylon cable where the entire length of the cable serves as the contact point.

The headset adjustment mechanisms described herein also free up central space within the headset thereby allowing for a more streamlined design. The configurations described herein also free up valuable PCB real estate in the center of the PCB as compared to existing systems. This larger electrical design area is important because electrical routings on the PCB are critical to headset function.

The AR/VR headsets described herein may also readily form a side-mounted adjustment mechanism. Positioning a rotary actuator on the side of the headset provides improved ergonomic access by a user. The user is able adjust the fit with a simple turn. In addition, there is no portion of the adjustment mechanism that is integrated into the headset's structure such that there is not any unwanted intrusion into the inner space headset which is reserved for electronic components or the user's head.

The adjustment mechanism also serves to maintain synchronous movement of the arms on the headset in order maintain consistent pressure distribution around the circumference of the head. Maintaining consistent pressure distribution around the circumference of the head promotes user operability and comfort.

Figure 1B:
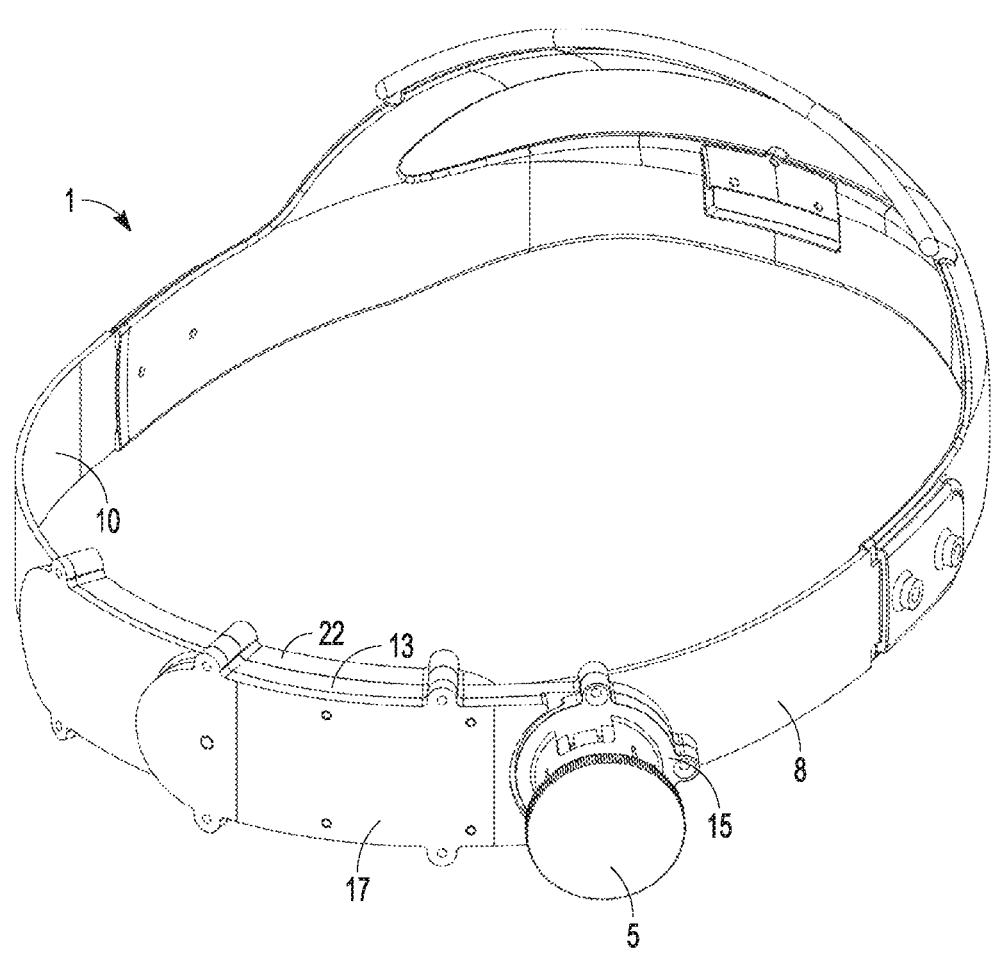
Figure 2A:
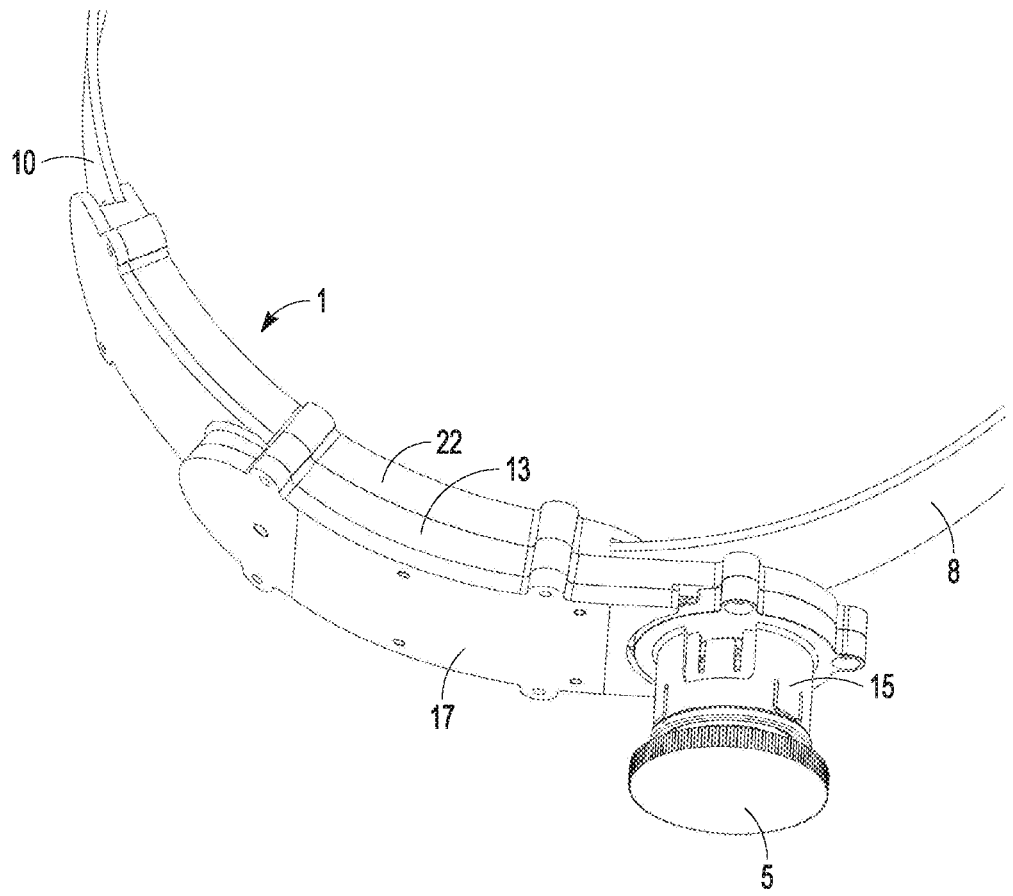
FIGS. 2A-2B show enlarged perspective views of the example headset shown in FIGS. 1A-1B to more clearly show an adjustment mechanism of the illustrated headset.
Figure 2B:
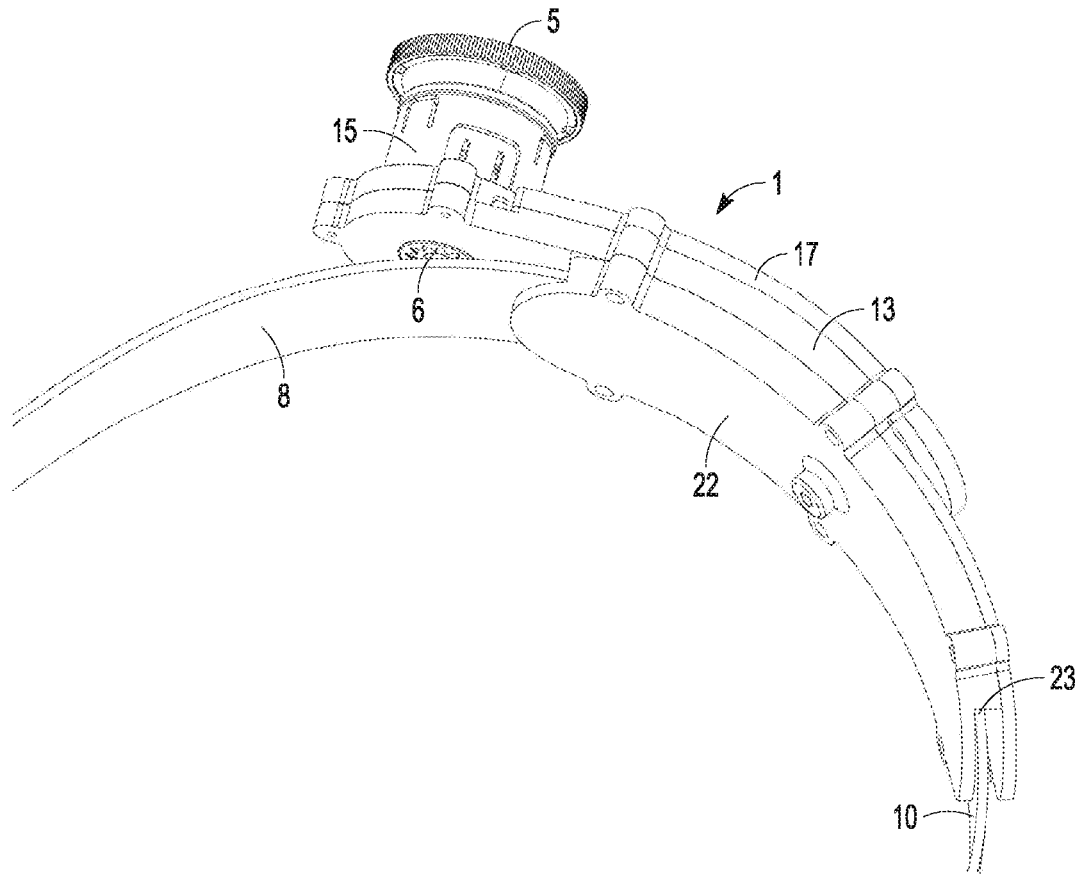

FIGS. 1A-1B shows an example AR/VR headset 1. that is configured to be worn on a user's head. FIGS. 2A-2B show enlarged perspective views of the example headset 1 shown in FIGS. 1A-1B to more clearly show an adjustment mechanism of the illustrated headset 1.

Figure 3:
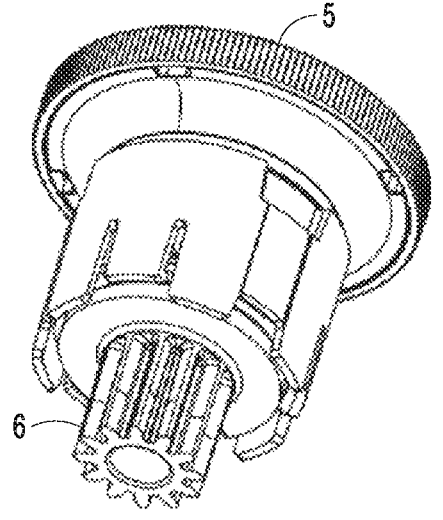
FIG. 3 shows a perspective view of the rotating actuator shown FIGS. 1 and 2.
Figure 4:
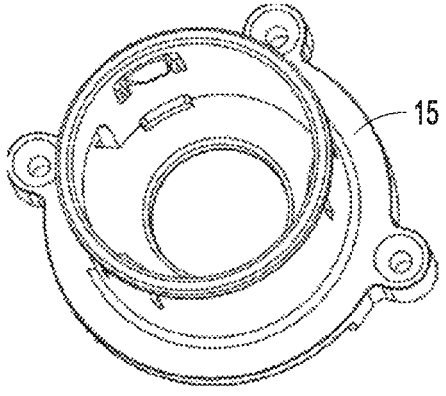
FIG. 4 shows a perspective view of the housing shown in FIGS. 1 and 2.
Figure 5:
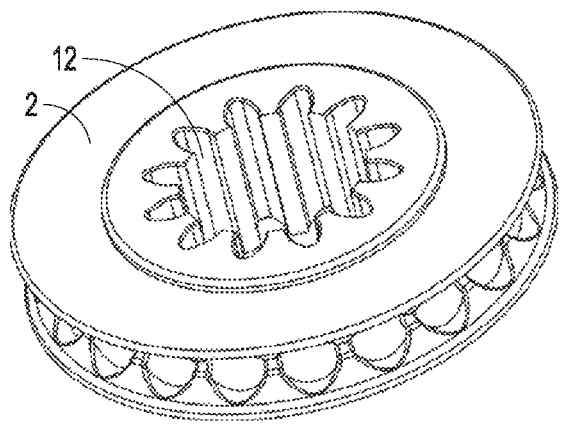
FIG. 5 shows a perspective view of a first sprocket used in the example headset shown in FIGS. 1A-1B.

The headset 1 includes a first sprocket 2 (FIG. 5), a second sprocket 3 (FIG. 6) and a ball chain 4 (FIG. 7) engaging the first sprocket 2 and the second sprocket 3. The headset 1 further includes a rotating actuator 5 (see also FIG. 3) that engages the first sprocket 2 such that the first sprocket 2 rotates and the ball chain 4 translates along the first sprocket 2 and the second sprocket 3 when torque is applied to the rotating actuator 5. The ball chain 4 in turn applies torque to the second sprocket 3 as the ball chain 4 translates along the first sprocket 2 and the second sprocket 3.

It should be noted that the relative sizes of the first sprocket 2 and the second sprocket 3 will depend in part on the relative sizes of the other components that make up the headset 1 as well as design considerations that are associated with allowing a user to comfortably apply a torque to the rotating actuator 5.

Similar factors apply regarding design choices for the ball chain 4. The number and size of the individual ball links as well as the overall length of the ball chain for will vary depending upon the desired operability of the headset 1. It should be noted that the first sprocket 2 and the second sprocket 3 are configured to receive the individual ball links in the ball chain 4 as the ball chain 4 translates between the first sprocket 2 and the second sprocket 3.

The rotating actuator 5 includes a driver gear 6 (see e.g., FIGS. 3, 6 and 7) that engages the first sprocket 2 such that driver gear 6 rotates the first sprocket 2. In the example form illustrated in the FIGS., the driver gear 6 is part of the rotating actuator 5 and engages internal teeth 12 on the first sprocket 2.

The driver gear 6 is press-fit into an opening in the first sprocket 2 where exterior teeth on the driver gear 6 engage with the interior teeth 12 that are located within a corresponding opening in the first sprocket 2. The overall size and shape of the driver gear 6 and the corresponding opening in the first sprocket 2 will mostly depend on the exterior size and shape of the first sprocket 2.

The selection of a rotating actuator 5 will be determined in part by the torque that is required in order to adjust the headset 1 for optimal operation of the adjustment mechanism by a user. Other forms of the headset 1 are contemplated where the other components that make up the headset 1 may be configured to work with different sizes and types of rotating actuators 5.

It should be noted that although the FIGS. show the driver gear 6 and the first sprocket 2 having a common longitudinal axis other forms are contemplated where the driver gear 6 and the first sprocket 2 have different or unparallel longitudinal axes. In other forms of the headset 1, the rotating actuator 5 may apply torque to the first sprocket 2 through one or more other items.

The headset 1 further includes a transmission gear 7 (see, e.g., FIGS. 6 and 7) that engages the second sprocket 3 such that transmission gear 7 rotates with the second sprocket 3. It should be noted that while the transmission gear 7 and the second sprocket 3 are shown as having a common longitudinal axis. Other forms of the headset 1 are also contemplated where the transmission gear 7 and the second sprocket 3 have different or unparallel longitudinal axes.

Figure 6:
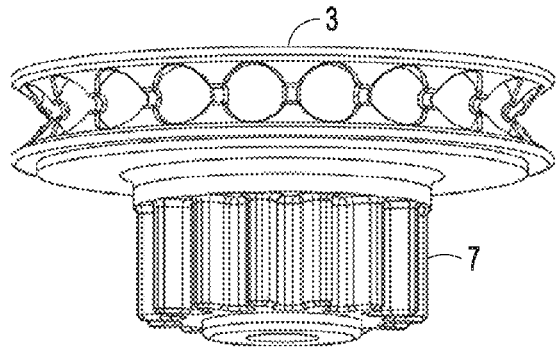
FIG. 6 shows a perspective view of a second sprocket used in the example headset shown in FIGS. 1A-1B.
Figure 7A:
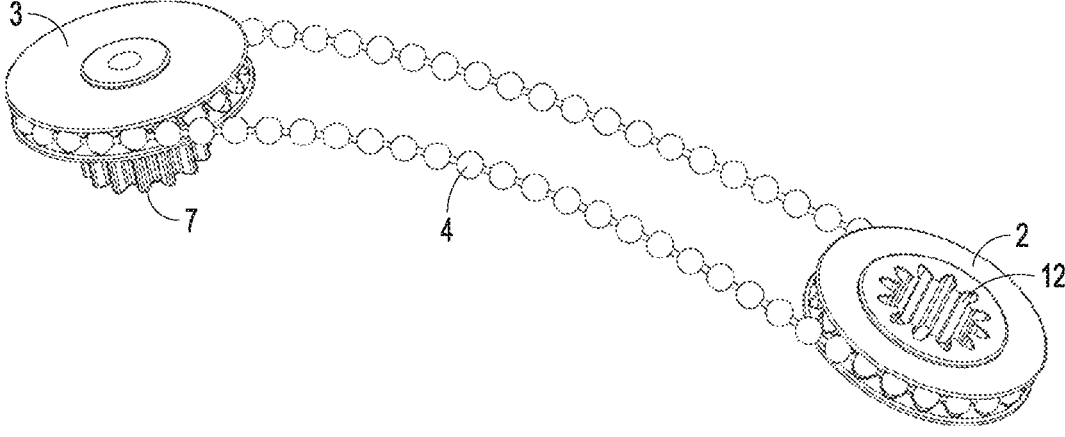
FIGS. 7A-7B show perspective views of a first sprocket, a second sprocket and a ball chain engaging the first sprocket and the second sprocket.
Figure 7B:
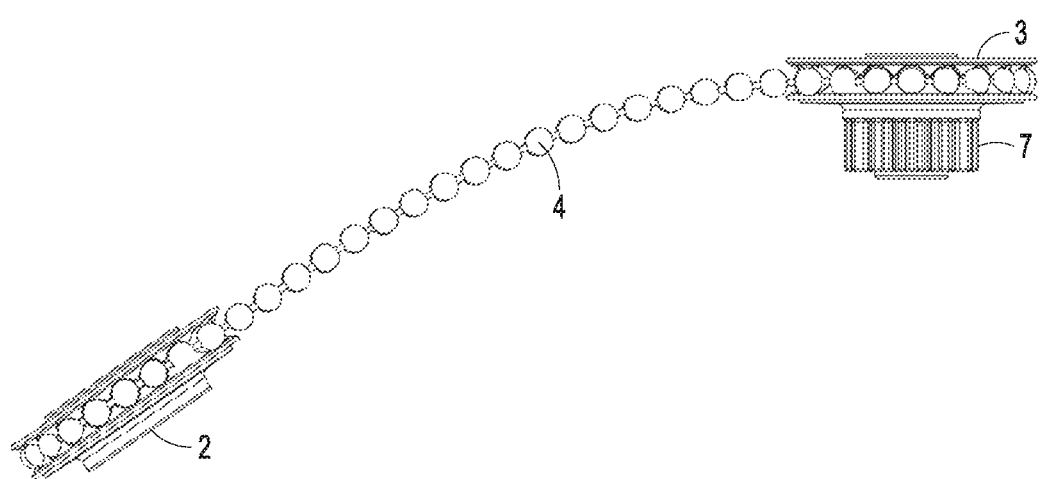

As shown most clearly in FIGS. 6 and 7, the second sprocket 3 is integral with the transmission gear 7. It should be noted that other forms of the headset 1 are contemplated where the second sprocket 3 and the transmission gear 7 are separate components.

The headset 1 further includes a first arm 8 that includes a first set of internal gear teeth 9 and a second arm 10 (see, e.g., FIGS. 1, 2, 18 and 19) that includes a second set of internal gear teeth 11. The transmission gear 7 engages the first set of gear teeth 9 and the second set of gear teeth 11 such that rotation of the transmission gear 7 moves the second arm 10 relative to the first arm 8.

The size and number of teeth in the first and second sets of internal gear teeth 9, 11 on the respective first and second arms 8, 10 will depend in part on the sizes of the first and second arms as well as the size of the transmission gear 7 and other components in the headset 1. In the illustrated forms, the first and second sets of internal gear teeth 9, 11 are arranged linearly along the respective first and second arms 8, 10.

Figure 8:
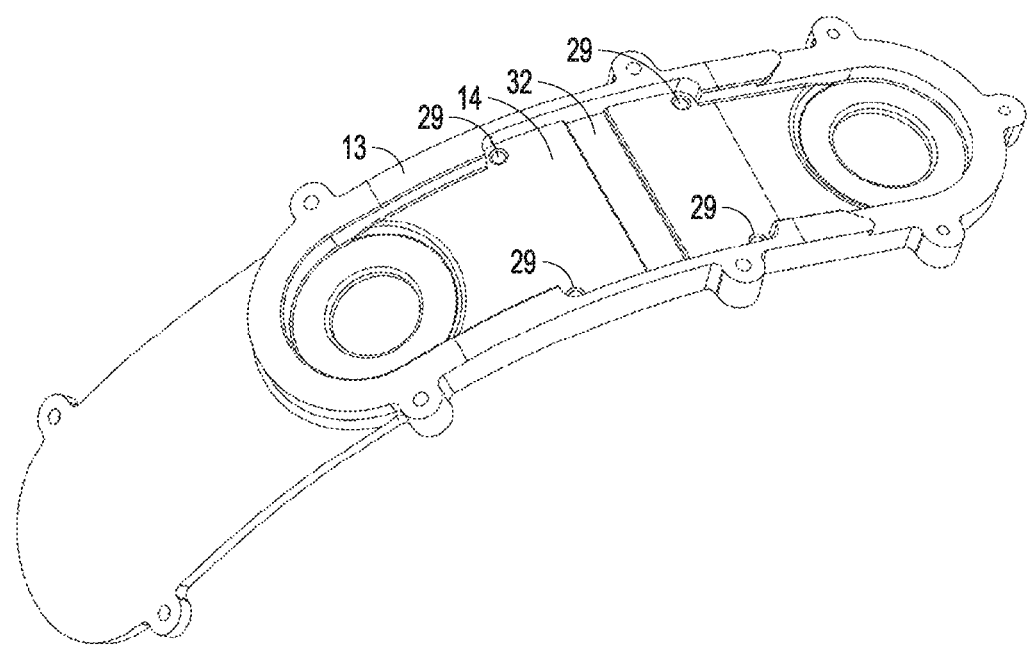
FIG. 8 shows a perspective view a second sprocket of an intermediate arcuate support used in the example headset shown in FIGS. 1A-1B.
Figure 9A:
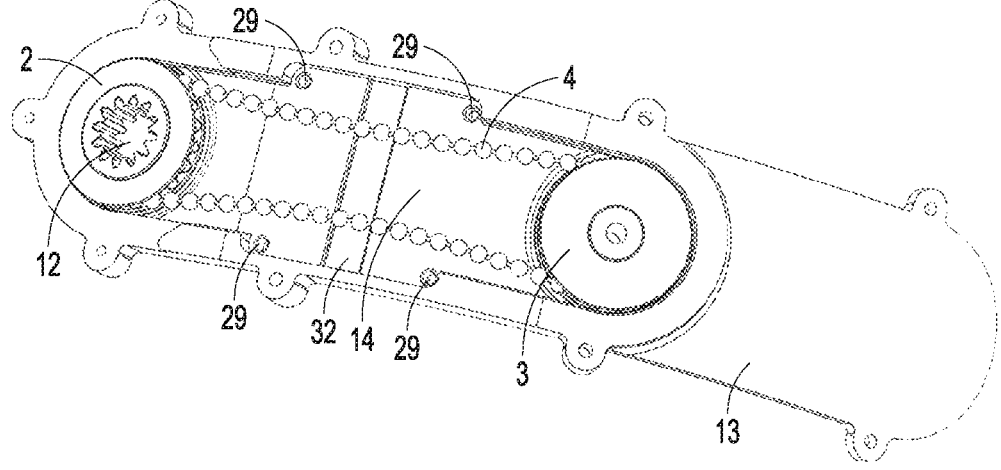
FIGS. 9A-9B show perspective views of the first sprocket, second sprocket and ball chain of FIG. 7 attached to the intermediate arcuate support.
Figure 9B:
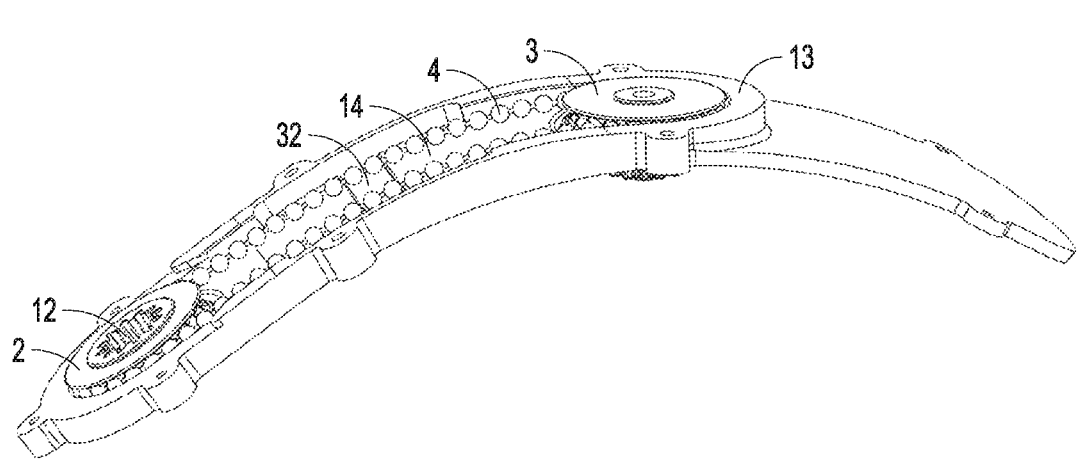

FIGS. 8A-8B illustrate and example intermediate arcuate support 13 that is included in the headset 1. The intermediate arcuate support 13 includes a first arcuate channel 14 such that the first sprocket 2 and second sprocket 3 rotate within the first arcuate channel 14 as the ball chain 4 translates within the first arcuate channel 14 (see, e.g., FIGS. 9A-9B and 17).

The overall size and configuration of the intermediate arcuate support 13 and the first arcuate channel 14 will depend in part on the size of the first sprocket 2, the second sprocket 3 and the ball chain 4 as well as the other components that make up the headset 1. Some example materials for the intermediate arcuate support 13 include, but are not limited to, nylon, acetal, metal or other rigid materials that preferably with low surface friction. Utilizing low friction materials for the intermediate arcuate support 13 allows the individual links in the ball chain 4 to more easily maneuver over the intermediate arcuate support 13 as the ball chain translates back and forth between the first sprocket 2 and the second sprocket 3.

As shown at least in FIGS. 1, 2, 4 and 19, a housing 15 is secured to the intermediate arcuate support 13. The rotating actuator 5 is secured within the housing 15 such that the rotating actuator 5 is rotatable within the housing 15.

The overall size and configuration of the housing 15 will depend in part on the size and configuration of the components that make up the rotating actuator 5. The interior shape of the housing 15 will generally conform to the exterior of the rotating actuator 5. Some example materials for the housing 15 include, but are not limited to, polypropylene, polycarbonate, ABS, Ultem, Acetal, glass filled nylon, high density polyethylene (HDPE), and ultra-high molecular weight (UHMW) polyethylene.

Figure 10A:
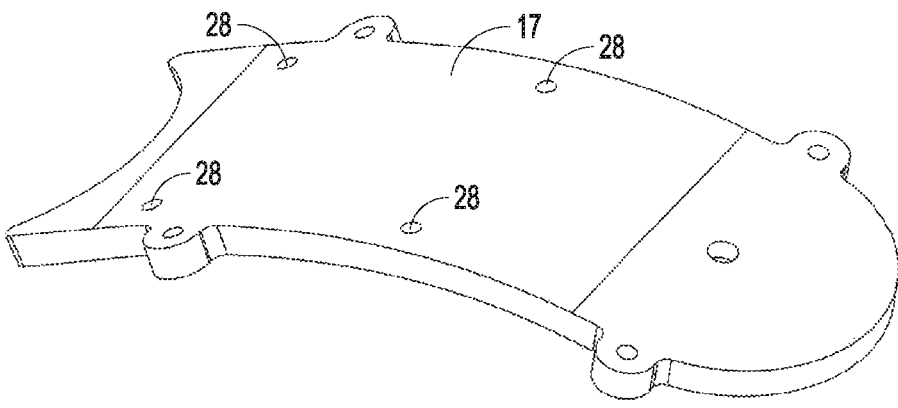
FIGS. 10A-10B show perspective views of an outer arcuate support used in the example headset shown in FIGS. 1A-1B.
Figure 10B:
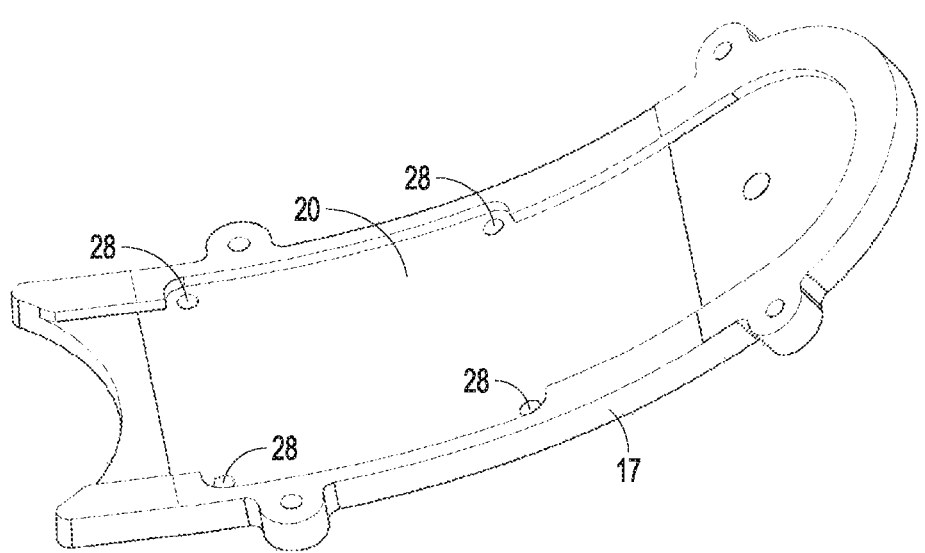
Figure 11:
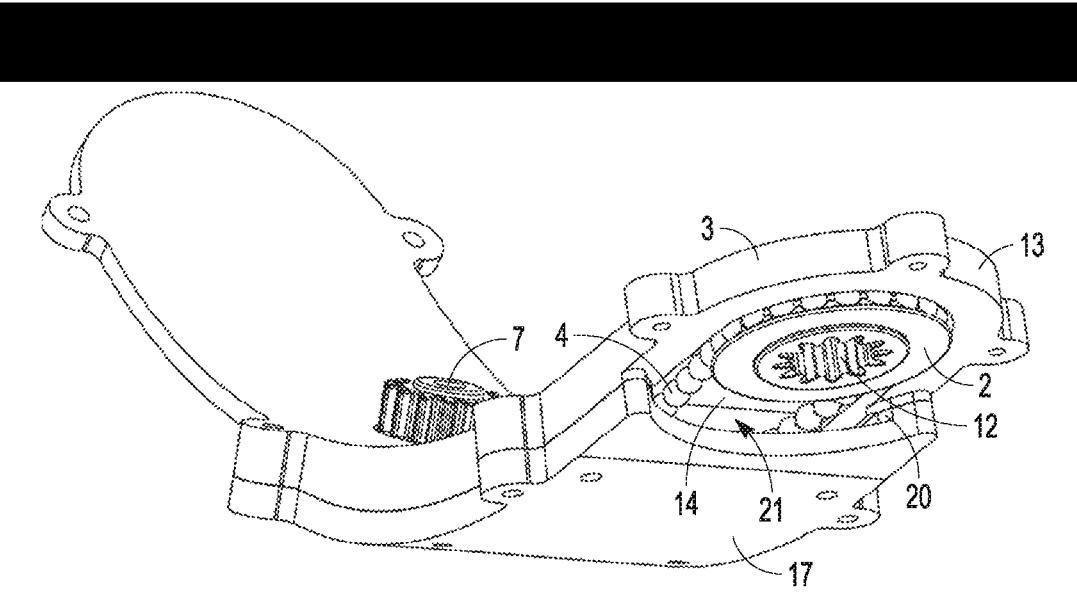
FIG. 11 shows a perspective view of an outer arcuate support as shown in FIGS. 10A-10B attached to an inter- mediate arcuate support as shown in FIGS. 9A-9B.
Figure 12:
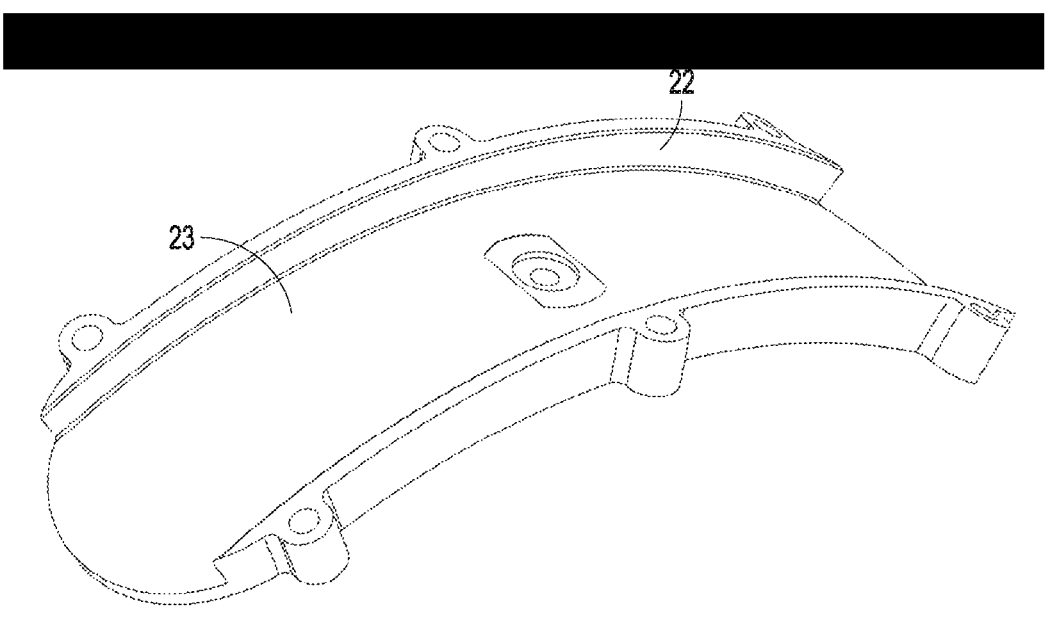
FIG. 12 shows a perspective view of an inner arcuate support used in the example headset shown in FIGS. 1A-1B.

The headset 1 further includes an outer arcuate support 17 (FIGS. 10A-10B) that is secured to the intermediate arcuate support 13 (see, e.g., FIGS. 1, 2, 11, 14, 15 18 and 19). The outer arcuate support 17 engages the second sprocket 3 and allows the second sprocket 3 to rotate relative to the intermediate arcuate support 13 and the outer arcuate support 17.

The overall size and configuration of the outer arcuate support 17 and the second arcuate channel 20 will depend in part on the size of the first sprocket 2, the second sprocket 3 and the ball chain 4 as well as the other components that make up the headset 1. Some example materials for the outer arcuate support 17 include, but are not limited to, polypropylene, polycarbonate, ABS, Ultima, Acetal, glass filled nylon, high density polyethylene (HDPE), ultra-high molecular weight (UHMW) polyethylene, various aluminum alloys, stainless steel alloys, magnesium, titanium, molybdenum and carbon fiber.

In the example forms of the headset 1 shown in the FIGS., the first arcuate channel 14 of the intermediate arcuate support 13 is a convex arcuate channel. In addition, the second arcuate channel 20 of the outer arcuate support 17 is a concave arcuate channel.

The first arcuate channel 14 on the intermediate arcuate support 13 is at least partially aligned with the second arcuate channel 20 on the outer arcuate support 17 such that the first sprocket 2, the second sprocket 3 and the ball chain 4 move within a curved recess 21 (see FIGS. 11, 14 and 15) formed by the first arcuate channel 14 and the second arcuate channel 20. The manner in which the intermediate arcuate support 13 is secured to the outer arcuate support 17 will depend in part on the relative sizes and shapes of the intermediate arcuate support 13 and the outer arcuate support 17 as well as the materials that are selected for the intermediate arcuate sport 13 and the outer arcuate support 17.

The overall size and configuration of the outer arcuate support 17 and the second arcuate channel 20 will also depend in part on the size of the first sprocket 2, the second sprocket 3 and the ball chain 4 as well as the other components that make up the headset 1. Some example materials for the outer arcuate support 17 include, but are not limited to, polypropylene, polycarbonate, ABS, Ultem, Acetal, glass filled nylon, high density polyethylene (HDPE), ultra-high molecular weight (UHMW) polyethylene, various aluminum alloys, stainless steel alloys, magnesium, titanium, molybdenum and carbon fiber.

Figure 13:
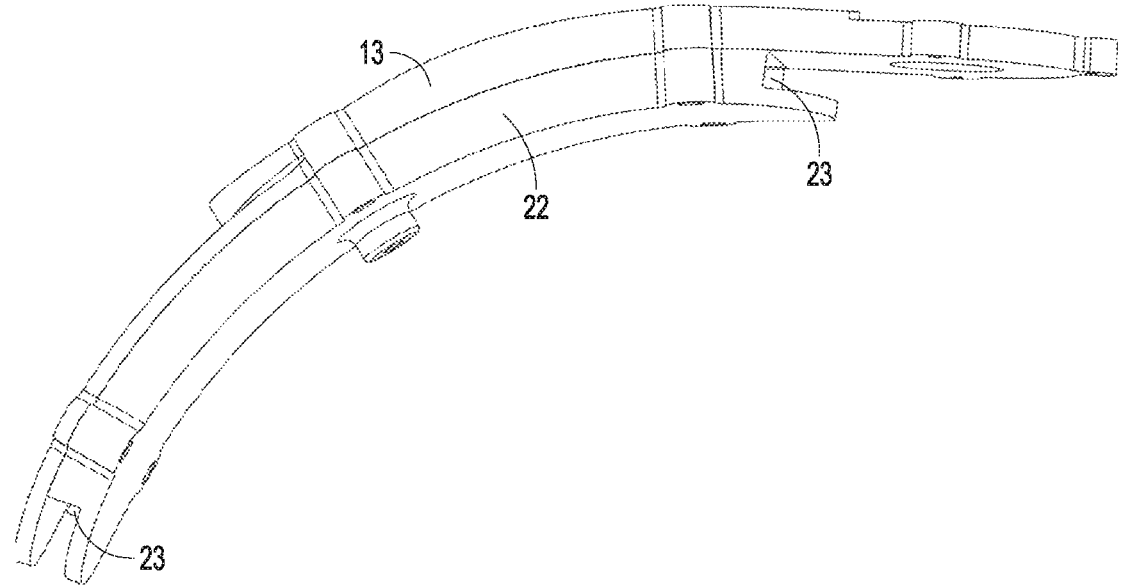
FIG. 13 shows a perspective view of the inner arcuate support shown in FIG. 12 attached to the intermediate arcuate support shown in FIG. 8.
Figure 14:
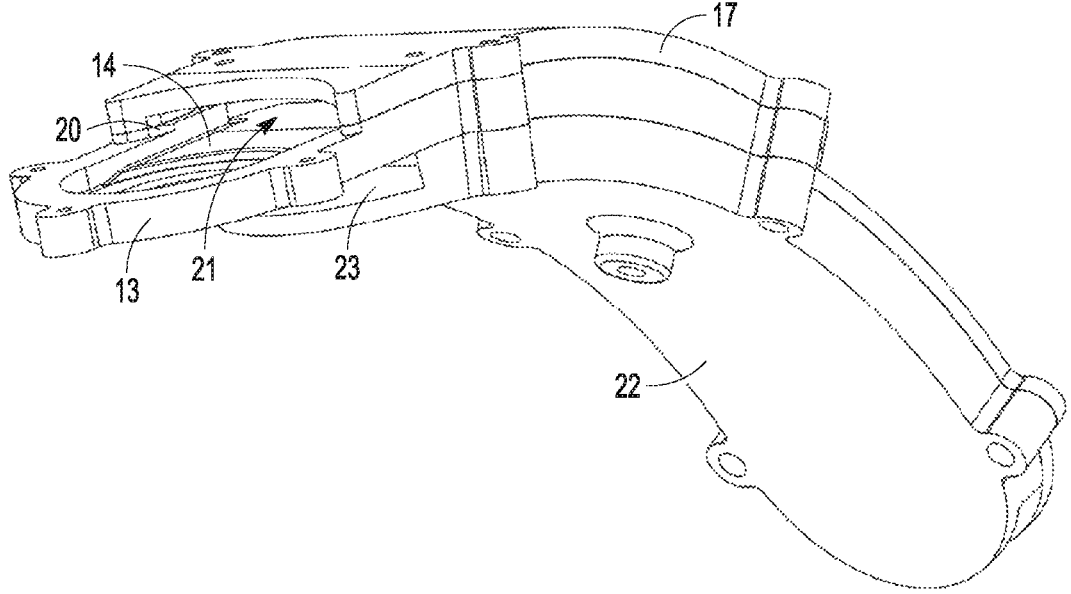
FIG. 14 shows a perspective view of the outer arcuate support, intermediate arcuate support and inner arcuate support assembled together without the first and second sprockets.

FIGS. 1, 2, 12-15, 17 and 18 show that the headset 1 further includes an inner arcuate support 22. The inner arcuate support 22 is secured to the intermediate arcuate support 13. The inner arcuate support 22 includes a third arcuate channel 23 that is a convex arcuate channel which receives the transmission gear 7 and the first and second arms 8, 10. FIGS. 13 and 14 show a perspective view of the outer arcuate support 17, intermediate arcuate support 13 and inner arcuate support 22 assembled together without the first and second sprockets 2, 3.

The manner in which the intermediate arcuate support 13 is secured to the inner arcuate support 17 will depend in part on the relative sizes and shapes of the intermediate arcuate support 13 and the outer arcuate support 17 as well as the materials that are selected for the intermediate arcuate sport 13 and the inner arcuate support 20. Some example materials for the inner arcuate support 22 include, but are not limited to, polypropylene, polycarbonate, ABS, Ultem, Acetal, glass filled nylon, high density polyethylene (HDPE), ultra-high molecular weight (UHMW) polyethylene, various aluminum alloys, stainless steel alloys, magnesium, titanium, molybdenum and carbon fiber.

Figure 15:
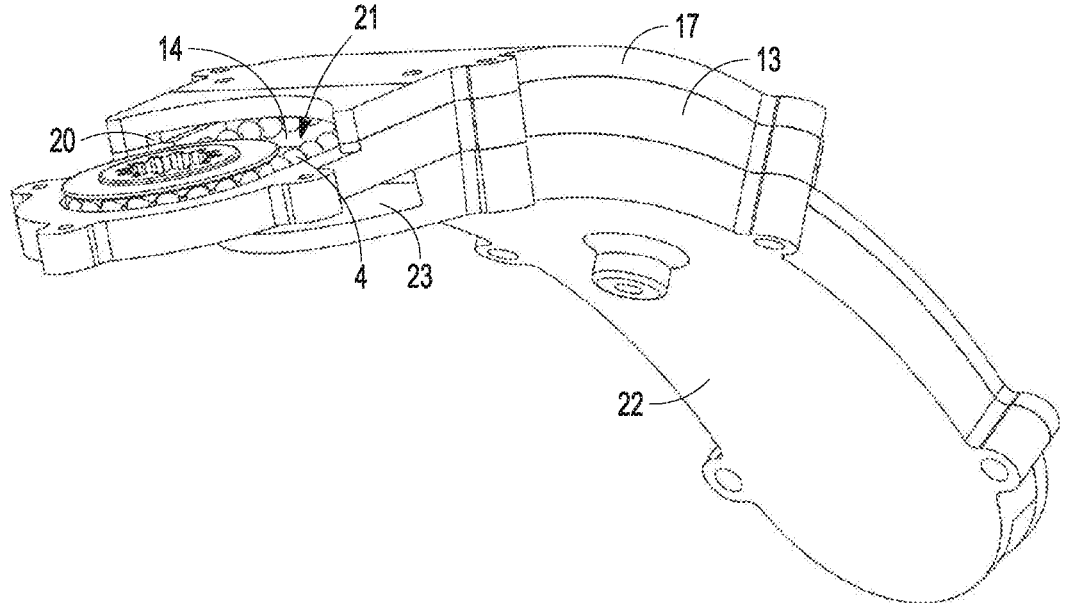
FIG. 15 shows a perspective view of the outer arcuate support, intermediate arcuate support and inner arcuate support assembled together with the first and second sprock- ets.

FIG. 14 shows a perspective view of the outer arcuate support 17, intermediate arcuate support 13 and inner arcuate support 22 assembled together without the first and second sprockets 2, 3. FIG. 15 shows a perspective view of the outer arcuate support 17, intermediate arcuate support 13 and inner arcuate support 22 assembled together with the first and second sprockets 2, 3 and the ball chain 4.

Figure 16A:
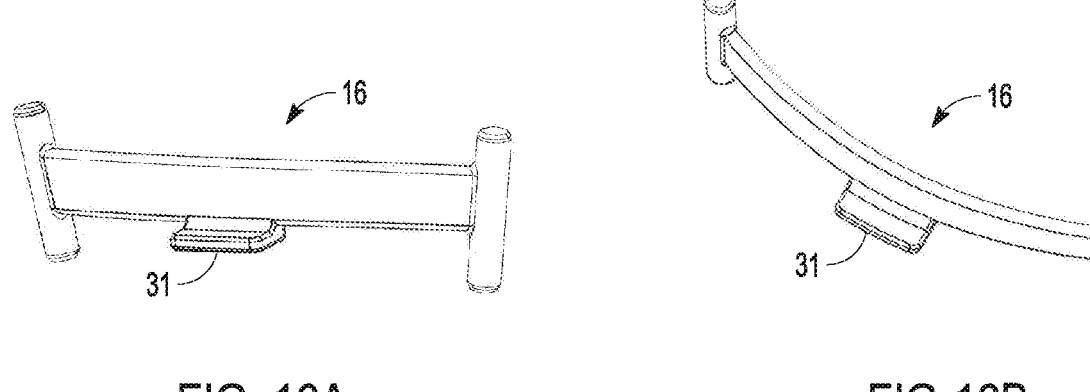
FIGS. 16A-16C show perspective views of an example leaf spring.
Figure 16B:
Figure 16C:
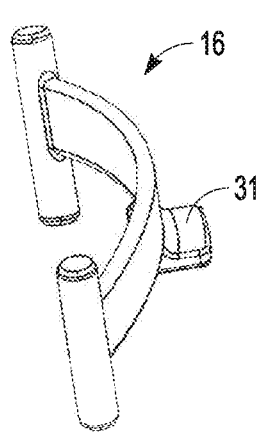
Figure 17:
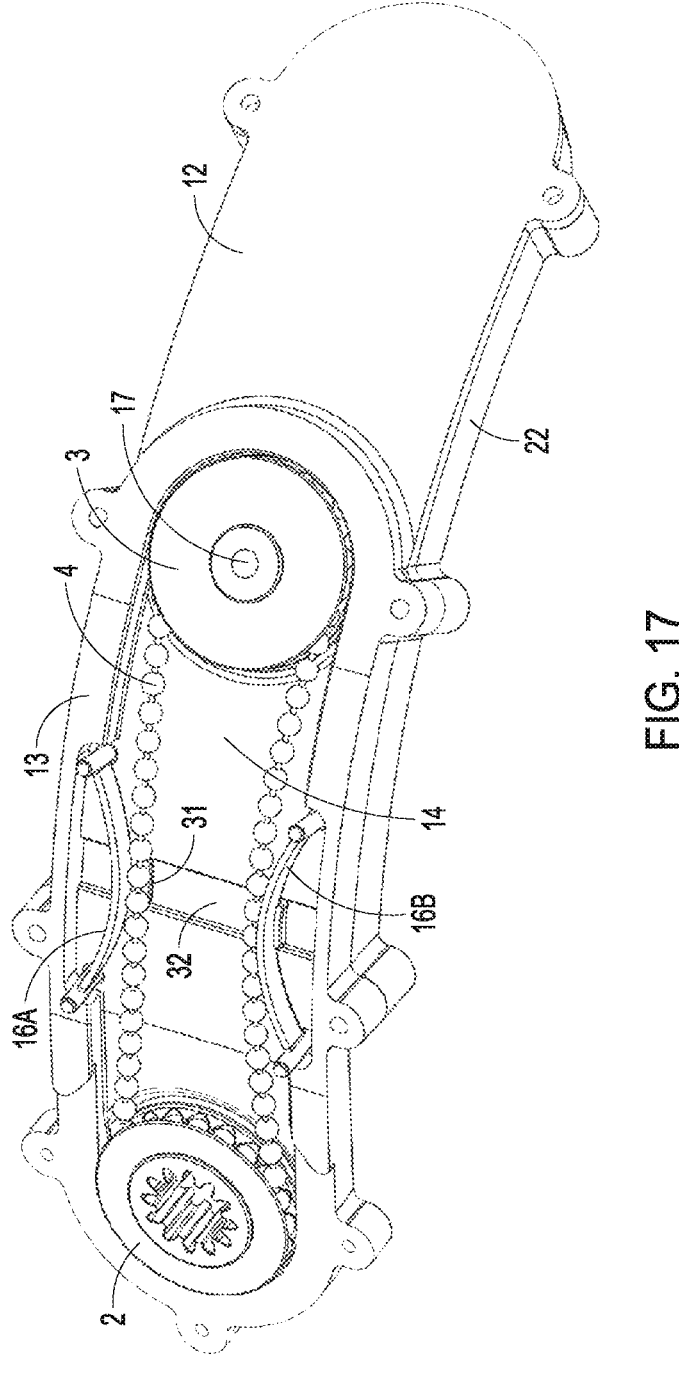
FIG. 17 shows a perspective view of two of the example leaf springs of FIG. 16 attached to the intermediate arcuate support to apply tension to the ball chain.

FIGS. 16A-16C show perspective views of an example leaf spring 16 that may be used in the headset 1 shown in FIGS. 1A-1B. FIG. 17 shows a perspective view of two of the example leaf springs of FIGS. 16A-16C attached to the intermediate arcuate support 13 to apply tension to the ball chain 4. A first leaf spring 16A is mounted within the first arcuate channel 14 such that the first leaf spring 16A applies to a force to the ball chain 4 to maintain tension of the ball chain 4 between the first sprocket 2 and second sprocket 3.

The headset 1 may also further include a second leaf spring 16B that is mounted within the first arcuate channel 14 such that the second leaf spring 16B applies to a force to the ball chain 4 to maintain tension of the ball chain 4 between the first sprocket 2 and second sprocket 3. In the example form illustrated in FIGS., the ball chain 4 is between the first leaf spring 16A and the second leaf spring 16B.

As shown most clearly in FIGS. 16A-16C, the first leaf spring 16A and the second leaf spring 16B each include a transverse fold 31 and the intermediate arcuate support 13 includes a transverse channel 32 (see FIGS. 8, 9A, 9B and 17). As shown most clearly in FIG. 17, each transverse fold 31 for the respective first leaf spring 16A and second leaf spring 16B is oriented within the transverse channel 32 of the intermediate arcuate support 13 in order to provide stabilization for the first leaf spring 16A and the second leaf spring 16B.

The overall size, configuration and orientation of the first leaf spring 16A and the second leaf spring 16B will depend in part on the relative sizes of the first sprocket 2, the second sprocket 3, and the number of individual links that are in the ball chain 4 (among other factors). One particularly important factor is the amount of force that needs to be applied to the ball chain 4 in order to keep the ball chain 4 under proper tension between the first sprocket 2 and the second sprocket 3 during adjustment of the headset 1. Some example materials for the first leaf spring 16A and the second leaf spring 16B include, but are not limited to, polypropylene, polycarbonate, ABS, Ultem, Acetal, glass filled nylon, high density polyethylene (HDPE), and ultra-high molecular weight (UHMW) polyethylene.

In some forms, the first leaf spring 16A and the second leaf spring 16B are each embedded within openings 28 in the outer arcuate support 17 (see, e.g., FIGS. 10A-10B) on one side of the respective first leaf spring 16A and second leaf spring 16B. In addition, the first leaf spring 16A and the second leaf spring 16B are positioned within locating holes 29 in the intermediate arcuate support 13 on an opposing side of the first leaf spring 16A and the second leaf spring 16B (see, e.g., FIGS. 8 and 9A). Other forms are contemplated where the first leaf spring 16A and the second leaf spring 16 B are each embedded within the inner arcuate support on the opposing side and positioned within locating holes on the original side.

Figure 18:
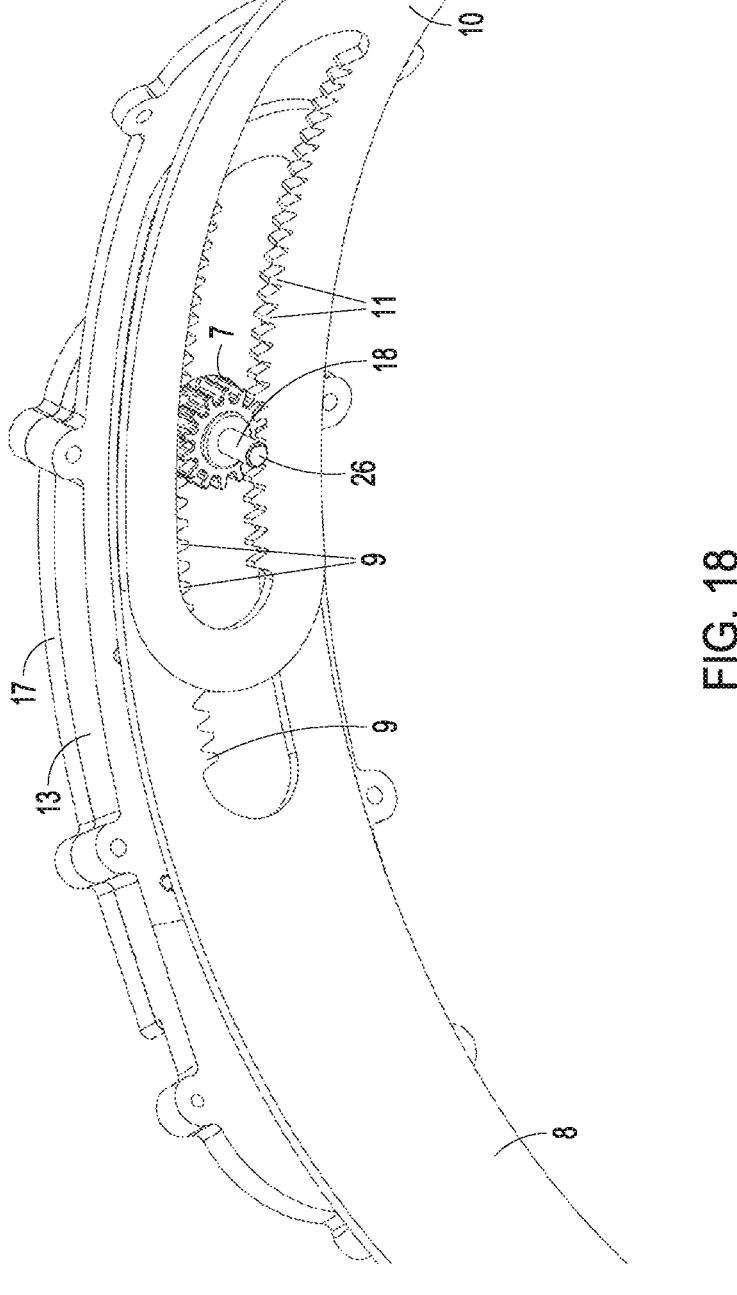
FIG. 18 shows a perspective view of the transmission gear engaging internal gear teeth on the first and second arms of the headset used in shown in FIGS. 1 and 2
Figure 19:
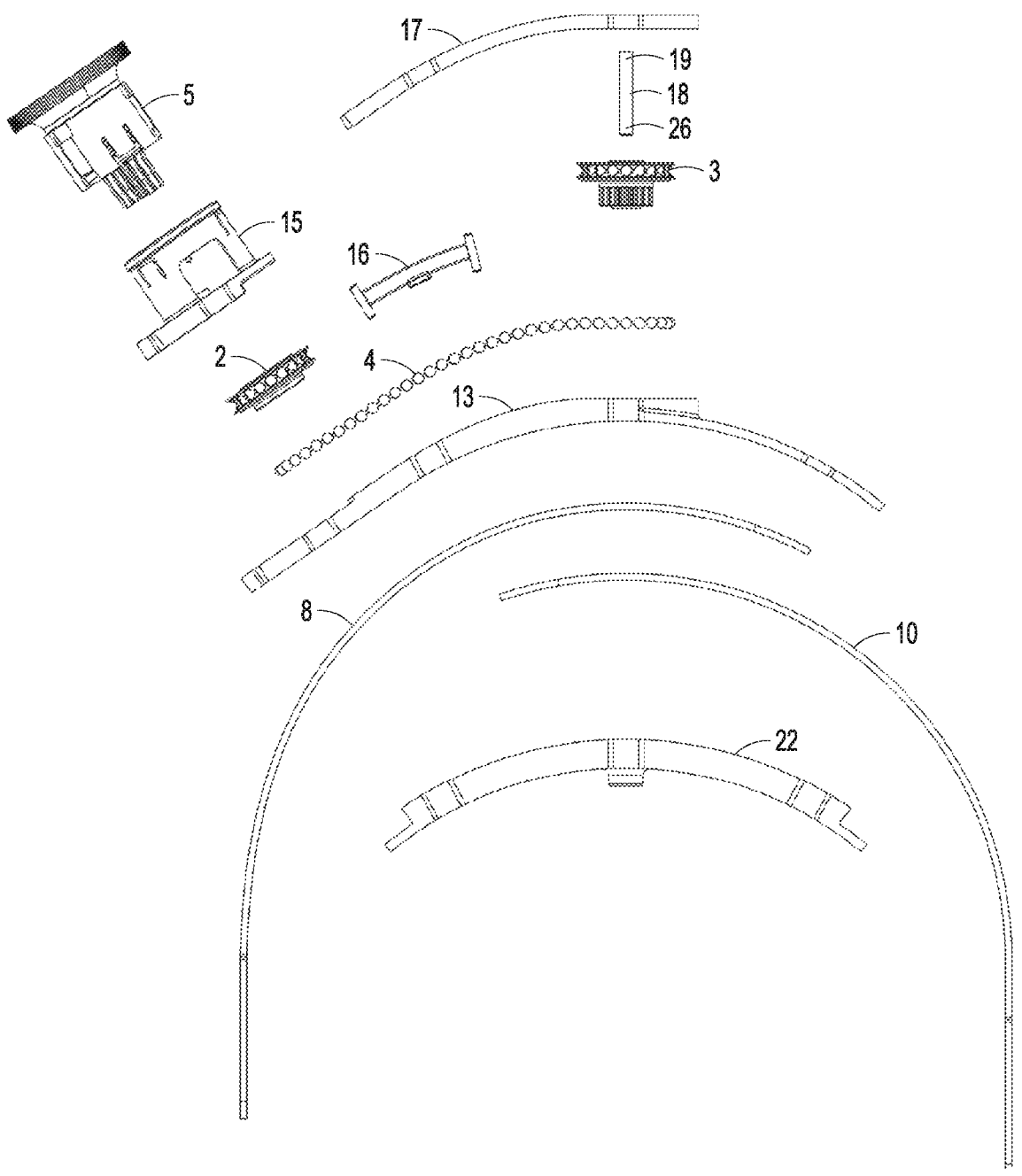
FIG. 19 shows an exploded perspective view of a portion of the headset shown in FIGS. 1 and 2.

As shown most clearly in FIGS. 17-19, the headset 1 further includes a pin 18 that has an end 19 which is embedded within the outer arcuate support 17. Although other forms are contemplated, a longitudinal axis of the pin 18 is aligned with the longitudinal axis of the second sprocket 3 and the transmission gear 7 such that the second sprocket 3 and the transmission gear 7 rotate about the pin 18.

The overall length and diameter of the pin 18 will depend in part on the sizes and configurations for the second sprocket 3 and the transmission gear 7. Some example materials for the pin 18 include, but are not limited to, various aluminum alloys, stainless steel alloys, magnesium, titanium, molybdenum and carbon fiber. In addition, the second sprocket 3 and the transmission gear 7 are preferably made from a low friction material that readily permits the second sprocket 3 and transmission gear 7 to rotate about the pin 18.

During adjustment of the headset 1, the first and second arms 8, 10 maneuver within the third arcuate channel 23 of the inner arcuate support 22 (not shown for clarity in FIG. 18) when the transmission gear 7 applies force to the first set of gear teeth 9 on the first arm 8 and the second set of gear teeth 11 on the second arm 10. The configuration and the material of first and second arms 8, 10 will depend in part on the size of the third arcuate channel 23 (or vice versa). The first arm 8 and the second arm 10 are also preferably shaped to make it easier to properly insert the first arm 8 and the second arm 10 into and through the third arcuate channel 23.

It should be noted that the first arm 8 and the second arm 10 may be moved such that they overlap more (i.e., to make the headset 1 smaller), or they may move such that the first arm 8 and the second arm 10 overlap less (i.e., to make the headset larger). The headset 1 will become larger or smaller depending on which direction the rotating actuator 5 is rotated. The configuration of the first arm 8 and the second arm 10 needs to be able to permit easy and comfortable adjustment of the first arm 8 relative to the second arm 10 by applying a torque to the rotating actuator 5.

As shown most clearly in the exploded view of FIG. 19, the pin 18 includes an opposing end 26 that is secured to the inner arcuate support 22 such that the transmission gear 7 and the second sprocket 3 rotate about the pin 18. In some forms, the end 19 of the pin 18 is press fit into the outer arcuate support 17 and the opposing end 26 of the pin 18 is press fit into the inner arcuate support 22.

The manner in which the opposing ends 19, 26 of the pin 18 are attached to the respective inner arcuate support 22 and outer arcuate support 17 will depend in part on the relative sizes of the items involved as well as the materials that are utilized for the inner arcuate support 22, outer arcuate support 17 and pin 18. Other forms of attachment for the pin 18 are contemplated (e.g., via an adhesive). The pin 18 may be made from a variety of materials including, but not limited to, metals or plastics.

The headsets described herein are small and scalable and address design concerns in an efficient and elegant manner. The headsets utilize space more efficiently thereby enabling the potential addition of new features and/or the creation of a more compact device. In addition, by improving the design of the adjustment mechanism, the production costs may be reduced to facilitate affordability by a user. The adjustment mechanism also promotes the comfort and fit of the headset for a user which may lead to longer usage times and a better overall user experience.

The design of the adjustment mechanism also readily allows the adjustment mechanism to be placed on the side of the headset thereby saving valuable space within the headset. A side location for the adjustment mechanism also avoids the need to accommodate the putting any portion of the adjustment mechanism through the headset's PCB thereby overcoming one of the significant design challenges that exist in current headsets.

EXAMPLES

To better illustrate the AR/VR headsets 1 disclosed herein, a non-limiting list of examples is provided here:

Example 1 is an AR/VR headset 1 comprising a first sprocket 2; a second sprocket 3; a ball chain 4 engaging the first sprocket 2 and the second sprocket 3; a rotating actuator 5 that includes a driver gear 6 that engages the first sprocket 2 such that the driver gear 6 applies torques to the first sprocket 2 to rotate the first sprocket 2 when torque is applied to the rotating actuator 5, wherein the first sprocket 2 causes the ball chain 4 to translate along the first sprocket 2 and the second sprocket 3 such that the ball chain 4 applies torque to the second sprocket 3 as the ball chain 4 translates along the first sprocket 2 and the second sprocket 3; a transmission gear 7 that engages the second sprocket 3 such that transmission gear 7 rotates with the second sprocket 3; a first arm 8 that includes a first set of internal gear teeth 9; and a second arm 10 that includes a second set of internal gear teeth 11, wherein transmission gear 7 engages the first set of gear teeth 9 and the second set of gear teeth 11 such that rotation of the transmission gear 7 moves the second arm 10 relative to the first arm 8.

Example 2 includes the headset 1 of example 1, wherein the driver gear 6 is part of the rotating actuator 5 and engages internal teeth 12 on the first sprocket 2.

Example 3 includes the headset 1 of any one of examples 1-2, wherein the driver gear 6 and the first sprocket 2 have a common longitudinal axis.

Example 4 includes the headset 1 of any one of examples 1-3, wherein the transmission gear 7 and the second sprocket 3 have a common longitudinal axis.

Example 5 includes the headset 1 of any one of examples 1-4, further comprising an intermediate arcuate support 13 that includes a first arcuate channel 14 such that the first sprocket 2 and second sprocket 3 are within the first arcuate channel 14 and rotate as the ball chain translates 4 within the first arcuate channel 14.

Example 6 includes the headset 1 of example 5, further comprising a housing 15 secured to the intermediate arcuate support 13, wherein the rotating actuator 5 is secured within the housing 15 such that the rotating actuator 5 is rotatable within the housing 15.

Example 7 includes the headset 1 of any one of examples 1-6, further comprising a first leaf spring 16A mounted within the first arcuate channel 14 such that the first leaf spring 16A applies to a force to the ball chain 4 to maintain tension of the ball chain 4 between the first sprocket 2 and second sprocket 3.

Example 8 includes the headset 1 of example 7, further comprising a second leaf spring 16B mounted within the first arcuate channel 14 such that the second leaf spring 16B applies to a force to the ball chain 4 to maintain tension of the ball chain 4 between the first sprocket 2 and second sprocket 3, wherein the ball chain 4 is between the first leaf spring 16A and the second leaf spring 16B.

Example 9 includes the headset 1 of any one of examples 1-8, further comprising an outer arcuate support 17 secured to the intermediate arcuate support 13 such that the outer arcuate support 17 engages the second sprocket 3 and allows the second sprocket 3 to rotate relative to the intermediate arcuate support 13 and the outer arcuate support 17.

Example 10 includes the headset 1 of any one of examples 1-9 further comprising a pin 18 that includes an end 19 which is embedded within the outer arcuate support 17, wherein a longitudinal axis of the pin 18 is aligned with the longitudinal axis of the second sprocket 3 and the transmission gear 7 such that the second sprocket 3 and the transmission gear 7 rotate about the pin 18.

Example 11 includes the headset 1 of any one of examples 1-10, wherein the first arcuate channel 14 of the intermediate arcuate support 13 is a convex arcuate channel and the outer arcuate support 17 includes a second arcuate channel 20 that is a concave arcuate channel, wherein the first arcuate channel 14 on the intermediate arcuate support 13 is at least partially aligned with the second arcuate channel 20 on the outer arcuate member 17 such that the first sprocket 2, the second sprocket 3 and the ball chain 4 move within a recess 21 formed by the first arcuate channel 14 and the second arcuate channel 20.

Example 12 includes the headset 1 of any one of examples 1-11, further comprising an inner arcuate support 22 that is secured to the intermediate arcuate support 13, wherein the inner arcuate support 22 includes a third arcuate channel 23 that is a convex arcuate channel which receives the transmission gear 7 and the first and second arms 8, 10 such that the first and second arms 8, 10 maneuver relative to one another within the third arcuate channel of the inner arcuate support 22 when the transmission gear 7 applies force to a first set of gear teeth 24 on the first arm 8 and a second set of gear teeth 25 on the second arm 10.

Example 13 includes the headset 1 of any one of examples 1-12, wherein an opposing end 26 of the pin 18 is secured to the inner arcuate support 22 such that the transmission gear 7 and the second sprocket 3 rotate about the pin 18.

Example 14 includes the headset 1 of any one of examples 1-13, wherein the end 19 of the pin 18 is press fit into the outer arcuate support 17 and the opposing end 26 of the pin 18 is press fit into the inner arcuate support 22.

Example 15 includes the headset 1 of any one of examples 1-14, wherein the second sprocket 3 is integral with the transmission gear 7.

Example 16 is an AR/VR headset 1 comprising a first sprocket 2; a second sprocket 3; a ball chain 4 engaging the first sprocket 2 and the second sprocket 3; a rotating actuator 5 that includes a driver gear 6 that engages the first sprocket 2 such that the driver gear 6 applies torques to the first sprocket 2 to rotate the first sprocket 2 when torque is applied to the rotating actuator 5, wherein the first sprocket 2 causes the ball chain 4 to translate along the first sprocket 2 and the second sprocket 3 such that the ball chain 4 applies torque to the second sprocket 3 as the ball chain 4 translates along the first sprocket 2 and the second sprocket 3; a transmission gear 7 that engages the second sprocket 3 such that transmission gear 7 rotates with the second sprocket 3; a first arm 8 that includes a first set of internal gear teeth 9; a second arm 10 that includes a second set of internal gear teeth 11, wherein transmission gear 7 engages the first set of gear teeth 9 and the second set of gear teeth 11 such that rotation of the transmission gear 7 moves the second arm 10 relative to the first arm 8; and a first leaf spring 16A that applies to a force to the ball chain 4 to maintain tension of the ball chain 4 between the first sprocket 2 and second sprocket 3.

Example 17 includes the headset 1 of example 16, further comprising a second leaf spring 16B that applies to a force to the ball chain 4 to maintain tension of the ball chain 4 between the first sprocket 2 and second sprocket 3, wherein the ball chain 4 is between the first leaf spring 16A and the second leaf spring 16B.

Example 18 includes the headset 1 of any one of examples 16-17, further comprising an intermediate arcuate support 13 that includes a first arcuate channel 14 such that the first sprocket 2 and second sprocket 3 rotate within the first arcuate channel 14; and an outer arcuate support 17 secured to the intermediate arcuate support 13 such that the outer arcuate support 17 engages the second sprocket 3 and allows the second sprocket 3 to rotate relative to the intermediate arcuate support 13 and the outer arcuate support 17, wherein one side 28 of the first leaf spring 16A and the second leaf spring 16B are embedded within the outer arcuate support 17 and an opposing side 30 of the first leaf spring 16A and the second leaf spring 16B are positioned within locating holes 29 in the intermediate arcuate support 13.

Example 19 includes the headset 1 of any one of examples 16-18, wherein the first leaf spring 16A and the second leaf spring 16B each include a transverse fold 31A, 31B and the intermediate arcuate support 13 includes a transverse channel 32 such that each transverse fold 31A, 31B is oriented within the transverse channel 32.

Example 20 is an AR/VR headset 1 comprising a first sprocket 2; a second sprocket 3; a ball chain 4 engaging the first sprocket 2 and the second sprocket 3; a rotating actuator 5 that includes a driver gear 6 that engages the first sprocket 2 such that the driver gear 6 applies torques to the first sprocket 2 to rotate the first sprocket 2 when torque is applied to the rotating actuator 5, wherein the first sprocket 2 causes the ball chain 4 to translate along the first sprocket 2 and the second sprocket 3 such that the ball chain 4 applies torque to the second sprocket 3 as the ball chain 4 translates along the first sprocket 2 and the second sprocket 3; a transmission gear 7 that engages the second sprocket 3 such that transmission gear 7 rotates with the second sprocket 3; a first arm 8 that includes a first set of internal gear teeth 9; a second arm 10 that includes a second set of internal gear teeth 11, wherein transmission gear 7 engages the first set of gear teeth 9 and the second set of gear teeth 11 such that rotation of the transmission gear 7 moves the second arm 10 relative to the first arm 8; an intermediate arcuate support 13 that includes a first arcuate channel 14 such that the first sprocket 2 and second sprocket 3 rotate within the first arcuate channel 14 as the ball chain translates 4 within the first arcuate channel 14; an outer arcuate support 17 secured to the intermediate arcuate support 13 such that the outer arcuate support 17 engages the second sprocket 3 and allows the second sprocket 3 to rotate relative to the intermediate arcuate support 13 and the outer arcuate support 17, wherein the first arcuate channel 14 of the intermediate arcuate support 13 is a convex arcuate channel and the outer arcuate support 17 includes a second arcuate channel 20 that is a concave arcuate channel, wherein the first arcuate channel 14 on the intermediate arcuate support 13 is at least partially aligned with the second arcuate channel 20 on the outer arcuate member 17 such that the first sprocket 2, the second sprocket 3 and the ball chain 4 move within a recess 21 formed by the first arcuate channel 14 and the second arcuate channel 17; a pin 18 that includes an end 19 which is embedded within the outer arcuate support 17, wherein a longitudinal axis of the pin 18 is aligned with the longitudinal axis of the second sprocket 3 and the transmission gear 7 such that the second sprocket 3 and the transmission gear 7 rotate about the pin 18; and an inner arcuate support 22 that is secured to the intermediate arcuate support 13, wherein the inner arcuate support 22 includes a third arcuate channel 23 that is a convex arcuate channel which receives the transmission gear 7 and the first and second arms 8, 10 such that the first and second arms 8, 10 maneuver within the third arcuate channel 23 of the inner arcuate support 22 when the transmission gear 7 applies force to a first set of gear teeth 24 on the first arm 8 and a second set of gear teeth 25 on the second arm 10, wherein an opposing end 26 of the pin 18 is secured to the inner arcuate support 22 such that the transmission gear 7 and the second sprocket 3 rotate about the pin 18.

This overview is intended to provide non-limiting examples of the present subject matter. It is not intended to provide an exclusive or exhaustive explanation. The detailed description is included to provide further information about the AR/VR headsets 1 described herein.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An adjustable AR/VR headset 1 comprising:
a first sprocket;
a second sprocket;
a ball chain engaging the first sprocket and the second sprocket;
a rotating actuator that includes a driver gear that engages the first sprocket such that the driver gear applies torques to the first sprocket to rotate the first sprocket when torque is applied to the rotating actuator, wherein the first sprocket causes the ball chain to translate along the first sprocket and the second sprocket such that the ball chain applies torque to the second sprocket as the ball chain translates along the first sprocket and the second sprocket;
a transmission gear that engages the second sprocket such that transmission gear rotates with the second sprocket;
a first arm that includes a first set of internal gear teeth; and
a second arm that includes a second set of internal gear teeth, wherein transmission gear engages the first set of gear teeth and the second set of gear teeth such that rotation of the transmission gear moves the second arm relative to the first arm.

2. The headset of claim 1, wherein the driver gear is part of the rotating actuator and engages internal teeth on the first sprocket.

3. The headset of claim 2, wherein the driver gear and the first sprocket have a common longitudinal axis.

4. The headset of claim 1, wherein the transmission gear and the second sprocket have a common longitudinal axis.

5. The headset of claim 1, further comprising an intermediate arcuate support that includes a first arcuate channel such that the first sprocket and second sprocket are within the first arcuate channel and rotate as the ball chain translates within the first arcuate channel.

6. The headset of claim 5, further comprising a housing secured to the intermediate arcuate support, wherein the rotating actuator is secured within the housing such that the rotating actuator is rotatable within the housing.

7. The headset of claim 5, further comprising a first leaf spring mounted within the first arcuate channel such that the first leaf spring applies to a force to the ball chain to maintain tension of the ball chain between the first sprocket and second sprocket.

8. The headset of claim 7, further comprising a second leaf spring mounted within the first arcuate channel such that the second leaf spring applies to a force to the ball chain to maintain tension of the ball chain between the first sprocket and second sprocket, wherein the ball chain is between the first leaf spring and the second leaf spring.

9. The headset of claim 5, further comprising an outer arcuate support secured to the intermediate arcuate support such that the outer arcuate support engages the second sprocket and allows the second sprocket to rotate relative to the intermediate arcuate support and the outer arcuate support.

10. The headset of claim 9, further comprising a pin that includes an end which is embedded within the outer arcuate support, wherein a longitudinal axis of the pin is aligned with the longitudinal axis of the second sprocket and the transmission gear such that the second sprocket and the transmission gear rotate about the pin.

11. The headset of claim 10, wherein the first arcuate channel of the intermediate arcuate support is a convex arcuate channel and the outer arcuate support includes a second arcuate channel that is a concave arcuate channel, wherein the first arcuate channel on the intermediate arcuate support is at least partially aligned with the second arcuate channel on the outer arcuate member such that the first sprocket, the second sprocket and the ball chain move within a recess formed by the first arcuate channel and the second arcuate channel.

12. The headset of claim 11, further comprising an inner arcuate support that is secured to the intermediate arcuate support, wherein the inner arcuate support includes a third arcuate channel that is a convex arcuate channel which receives the transmission gear and the first and second arms such that the first and second arms maneuver relative to one another within the third arcuate channel of the inner arcuate support when the transmission gear applies force to a first set of gear teeth on the first arm and a second set of gear teeth on the second arm.

13. The headset of claim 12, wherein an opposing end of the pin is secured to the inner arcuate support such that the transmission gear and the second sprocket rotate about the pin.

14. The headset of claim 13, wherein the end of the pin is press fit into the outer arcuate support and the opposing end of the pin is press fit into the inner arcuate support.

15. The headset of claim 1, wherein the second sprocket is integral with the transmission gear.

16. An adjustable AR/VR headset comprising:
a first sprocket;
a second sprocket;
a ball chain engaging the first sprocket and the second sprocket;
a rotating actuator that includes a driver gear that engages the first sprocket such that the driver gear applies torques to the first sprocket to rotate the first sprocket when torque is applied to the rotating actuator, wherein the first sprocket causes the ball chain to translate along the first sprocket and the second sprocket such that the ball chain applies torque to the second sprocket as the ball chain translates along the first sprocket and the second sprocket;
a transmission gear that engages the second sprocket such that transmission gear rotates with the second sprocket;
a first arm that includes a first set of internal gear teeth;
a second arm that includes a second set of internal gear teeth, wherein transmission gear engages the first set of gear teeth and the second set of gear teeth such that rotation of the transmission gear moves the second arm relative to the first arm; and
a first leaf spring that applies to a force to the ball chain to maintain tension of the ball chain between the first sprocket and second sprocket.

17. The headset of claim 16, further comprising a second leaf spring that applies to a force to the ball chain to maintain tension of the ball chain between the first sprocket and second sprocket, wherein the ball chain is between the first leaf spring and the second leaf spring.

18. The headset of claim 17, further comprising:
an intermediate arcuate support that includes a first arcuate channel such that the first sprocket and second sprocket rotate within the first arcuate channel; and an outer arcuate support secured to the intermediate arcuate support such that the outer arcuate support engages the second sprocket and allows the second sprocket to rotate relative to the intermediate arcuate support and the outer arcuate support, wherein one side of the first leaf spring and the second leaf spring are embedded within the outer arcuate support and an opposing side of the first leaf spring and the second leaf spring are positioned within locating holes in the intermediate arcuate support.

19. The headset of claim 18, wherein the first leaf spring and the second leaf spring each include a transverse fold and the intermediate arcuate support includes a transverse channel such that each transverse fold is oriented within the transverse channel.

20. An adjustable AR/VR headset comprising:
a first sprocket;
a second sprocket;
a ball chain engaging the first sprocket and the second sprocket;
a rotating actuator that includes a driver gear that engages the first sprocket such that the driver gear applies torques to the first sprocket to rotate the first sprocket when torque is applied to the rotating actuator, wherein the first sprocket causes the ball chain to translate along the first sprocket and the second sprocket such that the ball chain applies torque to the second sprocket as the ball chain translates along the first sprocket and the second sprocket;
a transmission gear that engages the second sprocket such that transmission gear rotates with the second sprocket;
a first arm that includes a first set of internal gear teeth;
a second arm that includes a second set of internal gear teeth, wherein transmission gear engages the first set of gear teeth and the second set of gear teeth such that rotation of the transmission gear moves the second arm relative to the first arm;
an intermediate arcuate support that includes a first arcuate channel such that the first sprocket and second sprocket rotate within the first arcuate channel as the ball chain translates within the first arcuate channel;
an outer arcuate support secured to the intermediate arcuate support such that the outer arcuate support engages the second sprocket and allows the second sprocket to rotate relative to the intermediate arcuate support and the outer arcuate support, wherein the first arcuate channel of the intermediate arcuate support is a convex arcuate channel and the outer arcuate support includes a second arcuate channel that is a concave arcuate channel, wherein the first arcuate channel on the intermediate arcuate support is at least partially aligned with the second arcuate channel on the outer arcuate member such that the first sprocket, the second sprocket and the ball chain move within a recess formed by the first arcuate channel and the second arcuate channel;
a pin that includes an end which is embedded within the outer arcuate support, wherein a longitudinal axis of the pin is aligned with the longitudinal axis of the second sprocket and the transmission gear such that the second sprocket and the transmission gear rotate about the pin; and
an inner arcuate support that is secured to the intermediate arcuate support, wherein the inner arcuate support includes a third arcuate channel that is a convex arcuate channel which receives the transmission gear and the first and second arms such that the first and second arms maneuver within the third arcuate channel of the inner arcuate support when the transmission gear applies force to a first set of gear teeth on the first arm and a second set of gear teeth on the second arm, wherein an opposing end of the pin is secured to the inner arcuate support such that the transmission gear and the second sprocket rotate about the pin.

\* \* \* \* \*